US009860209B2

(12) United States Patent
Buchanan et al.

(10) Patent No.: US 9,860,209 B2
(45) Date of Patent: Jan. 2, 2018

(54) STATEFUL CONNECTION PROCESSING IN A SECURITY DEVICE CLUSTER

(71) Applicant: Cisco Technology, Inc., San Jose, CA (US)

(72) Inventors: Kevin A. Buchanan, Santa Cruz, CA (US); Andrew E. Ossipov, Richardson, TX (US); Kent Leung, Palo Alto, CA (US); Xun Wang, San Jose, CA (US); Zhijun Liu, Cupertino, CA (US); Weiwei Kang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 103 days.

(21) Appl. No.: 14/709,777

(22) Filed: May 12, 2015

(65) Prior Publication Data

US 2016/0337312 A1 Nov. 17, 2016

(51) Int. Cl.
H04L 29/00 (2006.01)
H04L 29/06 (2006.01)
H04L 12/801 (2013.01)

(52) U.S. Cl.
CPC .......... *H04L 63/0227* (2013.01); *H04L 47/10* (2013.01); *H04L 63/0254* (2013.01)

(58) Field of Classification Search
CPC .. H04L 63/0227; H04L 63/0218; H04L 47/10
See application file for complete search history.

(56) References Cited

U.S. PATENT DOCUMENTS

| 7,953,089 | B1 | 5/2011 | Ramakrishnan et al. |
| 8,218,561 | B2 | 7/2012 | Akhter et al. |
| 2002/0141401 | A1 | 10/2002 | Albert et al. |
| 2003/0123463 | A1 | 7/2003 | Yoshida et al. |
| 2004/0197079 | A1 | 10/2004 | Latvala et al. |
| 2008/0177868 | A1 | 7/2008 | Zilbershtein et al. |
| 2012/0057591 | A1* | 3/2012 | Erman ................ H04L 63/0218 370/389 |
| 2013/0073743 | A1 | 3/2013 | Ramasamy et al. |

(Continued)

OTHER PUBLICATIONS

Extended European Search Report in counterpart European Application No. 16155547.9, dated Sep. 5, 2016, 9 pages.

(Continued)

*Primary Examiner* — Izunna Okeke
(74) *Attorney, Agent, or Firm* — Edell, Shapiro & Finnan, LLC

(57) ABSTRACT

A method operable in a security device cluster having a plurality of security devices each configured to receive respective data flows. The method includes receiving a first segment of a flow at a first security device of the plurality of security devices, sending the first segment of the flow toward a destination node without the first security device of the plurality of security devices asserting ownership over the flow, receiving, from the destination node, a second segment of the flow at a second security device of the plurality of security devices, the second segment of the flow being responsive to the first segment, asserting, by the second security device of the plurality of security devices, ownership over the flow, and forwarding, from the first security device, packets of the flow subsequently received by the first security device to the second security device.

20 Claims, 6 Drawing Sheets

(56) References Cited

U.S. PATENT DOCUMENTS

| | | |
|---|---|---|
| 2013/0136126 A1 | 5/2013 | Wang et al. |
| 2013/0152156 A1 | 6/2013 | Allison et al. |
| 2014/0310390 A1 | 10/2014 | Sorenson, III et al. |
| 2014/0331311 A1 | 11/2014 | Zuk et al. |
| 2015/0146724 A1 | 5/2015 | Leung et al. |
| 2016/0087938 A1* | 3/2016 | Mihelich ............ H04L 63/0218 726/11 |

OTHER PUBLICATIONS

European Exam Report issued in counterpart European Application No. 16155547.9, dated Sep. 28, 2017, 5 pages.

* cited by examiner

STATEFUL CONNECTION PROCESSING IN A SECURITY DEVICE CLUSTER

TECHNICAL FIELD

Embodiments described herein relate to operations of a security device cluster.

BACKGROUND

Security devices, such as firewalls, can provide the first line of defense in an organization's network security infrastructure. They do so by matching corporate policies about users' network access rights to connection information surrounding each access attempt. If the user rights and connection information do not match, the firewall blocks the access connection. If the user rights and connection information do match, the firewall allows the traffic to flow through the network. In this way, a firewall forms the basic building block of an organization's network security architecture.

It is desirable to employ security device technology that can grow with the increasing growth of network traffic, including voice, video, and collaborative traffic that operate at increasingly higher speeds. Firewalls, for example, are presently configured to analyze traffic not only at Layer 2 and Layer 3, but are now also being configured to provide application-level inspection to examine, identify, and verify application types at Layer 7 to make sure unwanted or misbehaving application traffic does not join the network. With these capabilities, a firewall can enforce endpoint user registration and authentication and provide administrative control over the use of multimedia applications. With both increased traffic and increased operational demands, firewalls and other security devices have recently been configured to operate in security device "clusters," with each such cluster comprising a plurality of firewalls and/or other security devices.

DESCRIPTION OF EXAMPLE EMBODIMENTS

Overview

Figure 1A:
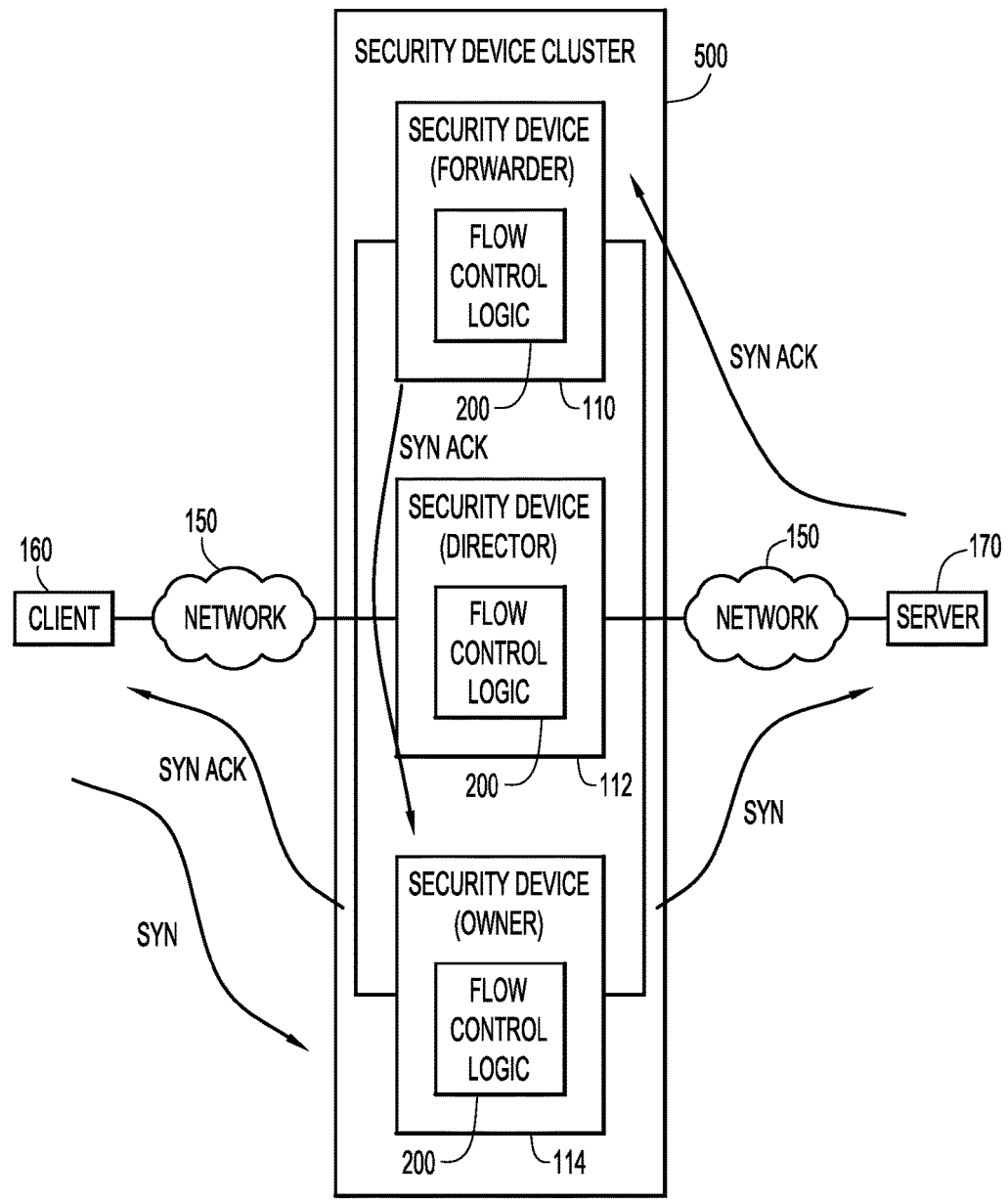
FIGS. 1A and 1B are block diagrams of components that may be employed to implement stateful connection processing in a security device cluster according to an example embodiment.

A method is disclosed that is operable in a security device cluster having a plurality of security devices each configured to receive respective data flows. The method includes receiving a first segment of a flow at a first security device of the plurality of security devices, sending the first segment of the flow toward a destination node without the first security device of the plurality of security devices asserting ownership over the flow, receiving, from the destination node, a second segment of the flow at a second security device of the plurality of security devices, the second segment of the flow being responsive to the first segment, asserting, by the second security device of the plurality of security devices, ownership over the flow, and forwarding, from the first security device, packets of the flow subsequently received by the first security device to the second security device. A security device cluster operable in accordance with the method is also described.

Example Embodiments

Modern stateful security devices operate by coalescing packets of a particular connection into a single ordered flow and applying various checks up to the application level (i.e., Layer 7). As one example, this process involves ensuring the forward gapless progression of Transmission Control Protocol (TCP) sequence numbers along each direction of a single TCP connection. In a typical implementation, every byte of a payload is accounted for in order for a stateful firewall to permit the associated segment. This strict checking requires that a single processing instance (such as a thread) maintains exclusive access to the stateful flow record in order to verify compliance and update the current state (such as last seen and next expected sequence numbers) in real time. Various software and hardware lock structures can be used within a single security device to ensure such exclusive access, but a management problem quickly emerges when using a distributed security device cluster of independently operating security devices (either blade or virtual instances within a chassis or multiple physical chassis). Within such a stateful cluster, the role of processing all packets for a single flow is typically assigned to a particular member device for the lifetime of that flow.

In the presence of flow asymmetry that is common in both data center and edge deployments, different directions of the same flow may load-balance to different stateful security devices in a single security device cluster. When this happens, packets are redirected to a single unit for processing either in-band (using data interfaces) or out-of-band (using a separate control link) in order for that single unit to perform its processing operations. Such redirection, however, is very expensive both in terms of firewall processing and in terms of network resources, even when all cluster members are geographically co-located. Where inter-site (i.e., not geographically co-located) stateful security clustering deployments are implemented, packet redirection may occur over long distance inter-site links (an effect commonly known as "tromboning"). Such inter-links are not sized for this purpose.

In order to optimize the use of network resources in distributed processing environments, embodiments described herein provide a mechanism that dynamically assigns the task of processing a given connection or flow within a stateful security device cluster in such a way that the amount of redirected traffic is minimized.

Reference is now made to FIG. 1A, which is a block diagram of components that may be employed to implement stateful connection processing in a security device cluster according to an example embodiment. Specifically, a security device cluster 500 is comprised of a plurality of security devices 110, 112 and 114. These security devices may be firewalls, intrusion detection systems, or any other form of security device that processes and/or analyzes connection flows. Each security device 110, 112, 114 includes flow control logic 200, which will be described more fully later herein. Those skilled in the art will appreciate that FIG. 1A illustrates a simplistic topology of an actual security device cluster, which might include tens or even hundreds of individual security devices.

As further shown, security device cluster 500 is in communication with a client 160 and server 170 via network 150. Although not shown, a load balancing mechanism may be present within (or external to) security device cluster 500 that directs connections or data flows received by or for security device cluster 500 to a given one of the security devices 110, 112, 114.

Since there are multiple security devices within cluster 500, it is possible that there may be asymmetric flows with respect to a given bi-directional connection between, e.g., client 160 and server 170. Taking TCP traffic as an example, and referring again to FIG. 1A, an initial TCP SYN segment sent by client 160 is received at security device 114. In conventional security device cluster implementations, the first security device to receive a TCP SYN segment is designated the "Owner" of the flow. The Owner might then select another security device (e.g., security device 112) to be a backup device (for storing state information about the flow). That backup device is also known as a "Director." One function of the Director is to operate as a lookup service for other security devices in the cluster. That is, the lookup service is used by a non-Owner security device to learn which other security device in the security device cluster is the Owner of a given flow so that a received flow can be forwarded to the Owner such that a single security device can process both bi-directional flows.

More specifically, in the TCP connection example, the next part of a connection handshake in a TCP connection is a TCP SYN ACK segment. As shown in FIG. 1A, the SYN-ACK segment is sent by server 170 and received, not at the flow Owner (security device 114), but at security device 110, which has no a priori knowledge of the flow. Security device 110 thus queries Director security device 112 to identify the correct Owner (in this case security device 114). Once security device 110 learns which security device is the Owner of the flow, security device 110 forwards the flow to that owner (114). As such, security device 110 is designated as a "Forwarder."

This forwarding methodology means that not all security devices within security device cluster 500 have to know the state of all flows. This allows for linear scaling of security device cluster.

Thus, as explained above, in a fully distributed stateful security device cluster, connection ownership is based on which member receives the first packet or segment for a connection. This ensures that at least one direction of a single connection traverses the same member that will process it. In the case of TCP connections, a given security device within the security device cluster assumes flow ownership based on receiving the first TCP SYN segment (client to server) for the connection. In the best case scenario (fully symmetrical distribution), the Owner unit also receives and processes all packets for the given flow. In the worst case scenario, the packets in the opposite direction (server to client) are received by another security device within the security device cluster and redirected by a Forwarder unit (after querying the Director and obtaining information about which device is designated as the Owner). That is, the worst case scenario is that in which an asymmetric bi-directional flow is set up.

In many client-server applications, however, more data is passed from the server to the client, e.g., downloading web browsing files and the like. In fact, it is not uncommon for only TCP ACK segments to be passed in the opposite direction (i.e., client 160 to server 170). As such, the connection owner assignment scheme that is described above (i.e., an Owner is determined based on which security device within the security device cluster first receives a TCP SYN segment) results in suboptimal network resource utilization where more data is received and redirected from a Forwarder to the Owner than is received and processed locally by the Owner itself.

To address this inefficiency, embodiments described herein are configured to transfer flow ownership to the security device that receives, in the context of a TCP connection, the TCP SYN-ACK segment. The "interim" Owner unit that receives the initial TCP SYN segment may create a limited stateful record (such as to retain unrecoverable TCP options) on the flow Director device or simply forward the TCP SYN to the destination (i.e., server 170). The security device that received the original TCP SYN packet thereafter becomes a Forwarder for the flow. The security device that receives the SYN ACK segment and becomes the Owner will retrieve the stateful record from the Director or recover it locally. If the traffic flow is symmetric, all processing still converges on the same unit. If the traffic flow is asymmetric, the amount of redirected data is reduced. The asymmetric scenario is depicted in more detail in FIG. 1B.

Figure 1B:
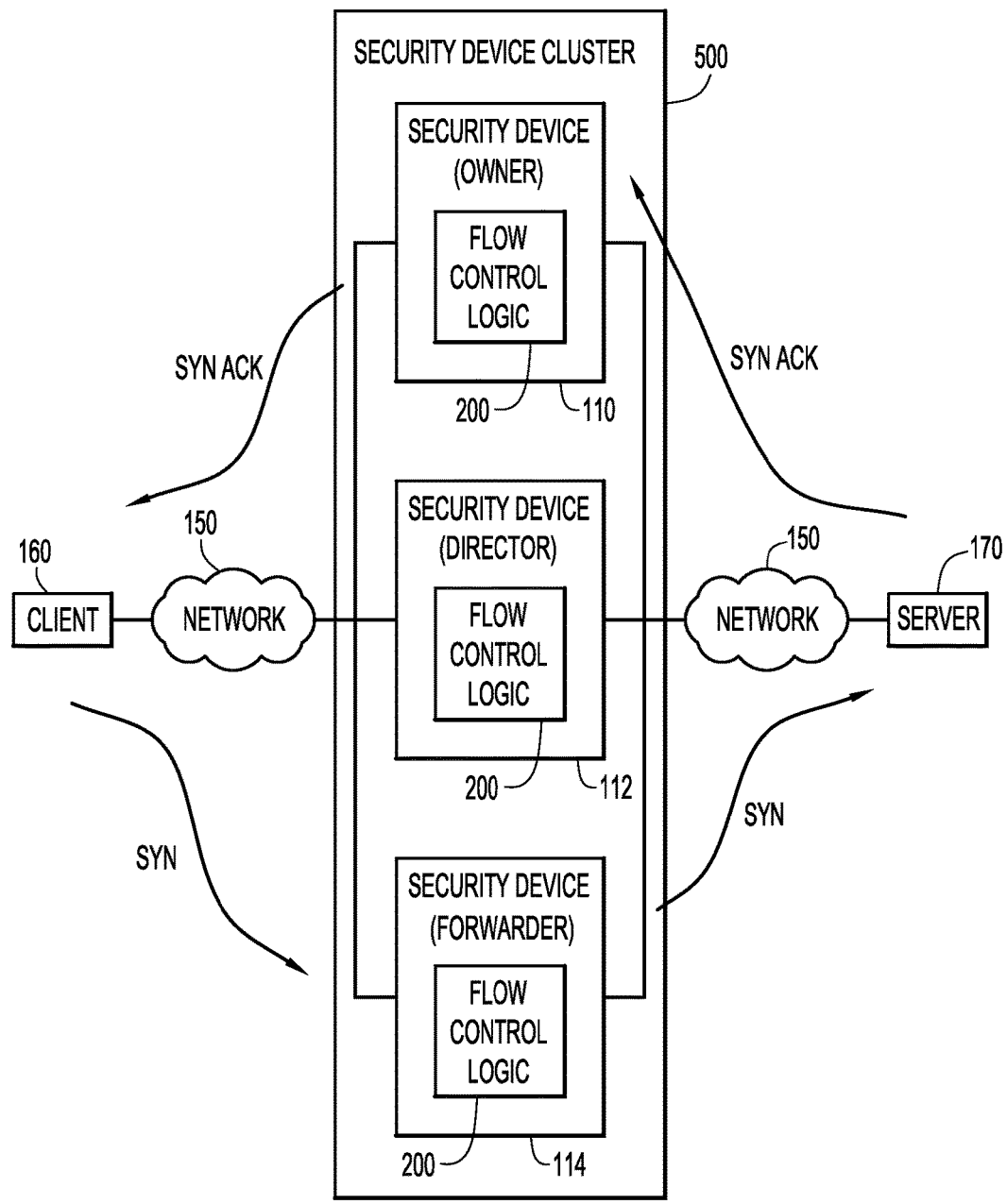

Specifically, FIG. 1B is a block diagram of components that may be employed to implement stateful connection processing in a security device cluster according to an example embodiment. In the embodiment shown, security device 114 receives a TCP SYN segment but does not assert ownership over the flow. Rather, security device 110, which receives the TCP SYN ACK segment asserts ownership over the flow. Security device 114 thereafter becomes a Forwarder. In this way, especially in a common client-server connection where the flow from the server to the client is often significantly more voluminous, there is much less forwarding that is performed within security device cluster 500.

Figure 2:
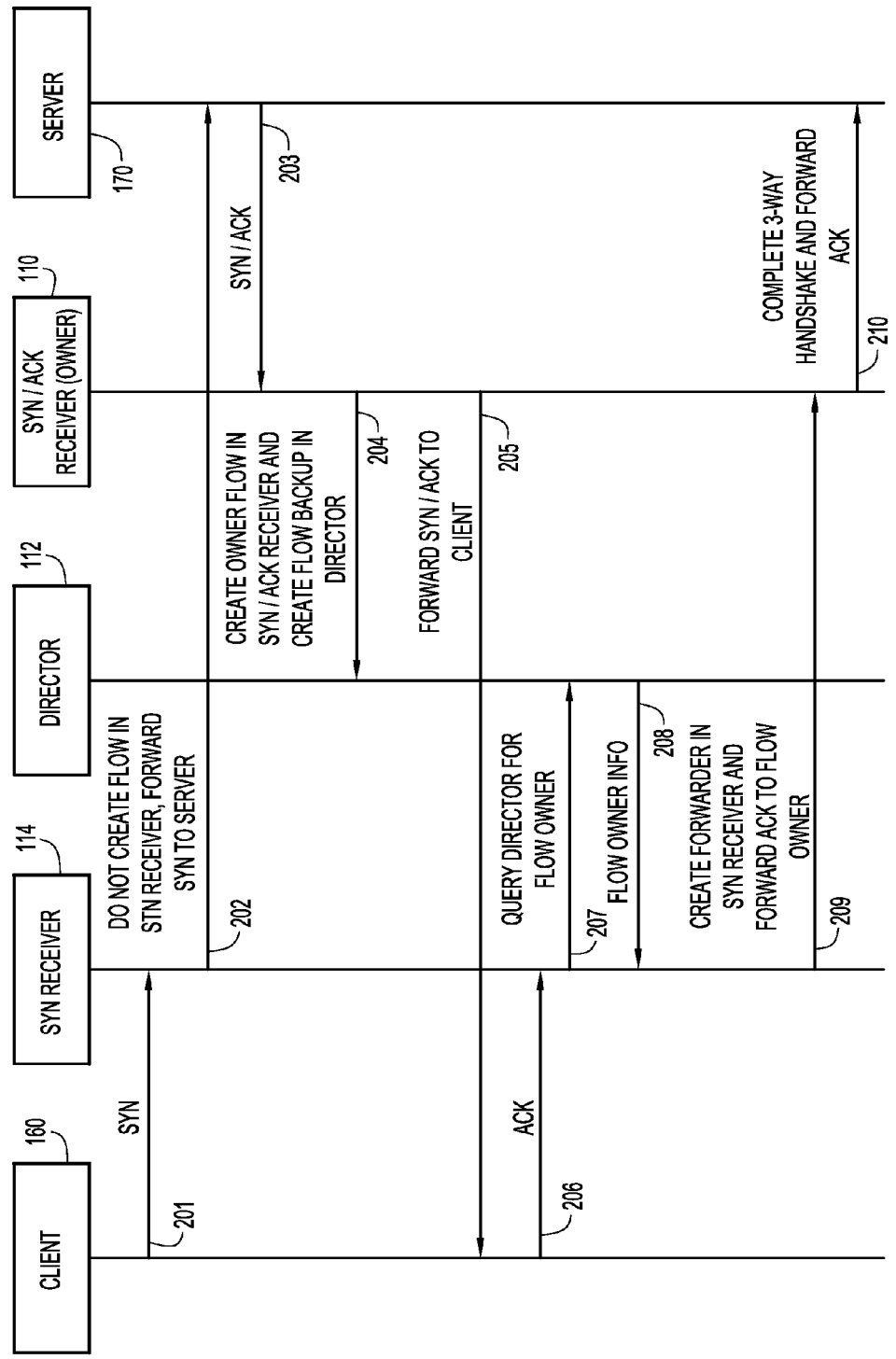
FIG. 2 is an example ladder diagram depicting a series of operations to implement stateful connection processing in a security device cluster according to an example embodiment.

FIG. 2 is an example ladder diagram depicting a series of operations to implement stateful connection processing in a security device cluster according to an example embodiment, and consistent with FIG. 1B. At the top of FIG. 2 are shown several of the same components that are also depicted in FIGS. 1A and 1B. Specifically, there are shown client 160, SYN Receiver (security device and Forwarder) 114, Director 112, SYN ACK Receiver (security device and Owner) 110 and server 170.

At 201, client 160 sends a SYN segment or packet towards server 170. The SYN packet is received by SYN Receiver 114. At 202, SYN Receiver 114 does not create a flow in SYN Receiver 114, and instead forwards the SYN segment to Server 170. In response, and in accordance with TCP, Server 170 replies with a SYN ACK segment at 203, which is received by SYN/ACK Receiver 110, which, in accordance with the embodiments described herein, asserts ownership over the flow. At 204, an owner flow is created in SYN ACK Receiver 110 and a flow backup is created in Director 112. Thereafter, at 205, the SYN ACK packet is sent to Client 160 from SYN/ACK Receiver and Owner 110.

At 206, Client 160 sends an ACK packet in accordance with TCP. The ACK packet is received by SYN Receiver 114. Because SYN Receiver 114 is not the Owner of the flow, at 207 SYN Receiver 114 queries Director 112 to identify the flow Owner. At 208, Director 112 sends flow ownership information to SYN Receiver 114. At 209, a Forwarder flow is created in SYN Receiver 114, and the ACK packet is forwarded to SYN ACK Receiver (Owner) 110. At 210, the ACK packet is sent from SYN ACK Receiver (Owner) 110 to Server 170 to complete the a-way TCP handshake.

In a small set of network applications (such as client backup), the assumption that there is more server-to-client than client-to-server traffic may not hold true. That is, more data may be transferred from the client to the server than the other way around. In other cases, external traffic distribution algorithms may change and prevent the initially selected Owner unit from seeing all or any of the packets belonging to the flow on the data interfaces. In the case of inter-site deployments, a particular protected endpoint may be migrated to a different data center. In such cases, and in accordance with an embodiment, security device cluster 500 may be configured to dynamically identify the security device that is best positioned for processing the flow and, thereafter, to dynamically reassign flow ownership to maintain the optimized use of network resources.

The flow ownership transfer process may be configured to apply primarily to long-lived connections (based on a configured time threshold) in order to minimize the processing overhead and maximize the benefit to the network. Several criteria can be used to dynamically transition the ownership of an established connection from one cluster member to another, including the following:

- A Forwarder of a long-lived flow has received more packets or bytes than the Owner during the last monitored period. Since the Owner knows how much traffic it received for a given flow from all Forwarders, the Owner could initiate a flow ownership transfer to a better candidate.
- Some applications (FTP, SIP, and similar) may require both control and data connections to reside on the same cluster member. A flow ownership change could select the Forwarder that directly receives most of the associated traffic. This will likely be one of the media or data connection Owners or Forwarders, since the control connection generates a relatively small amount of traffic.
- For inter-site deployments, a flow ownership transfer could be initiated based on detecting an endpoint migration from one site to another. As such, the local cluster member would assume ownership for all of the flows established from and to a particular endpoint. The flow Director could act as the arbitrator to implement the stateful record transfer and synchronized flow ownership change.

Figure 3:
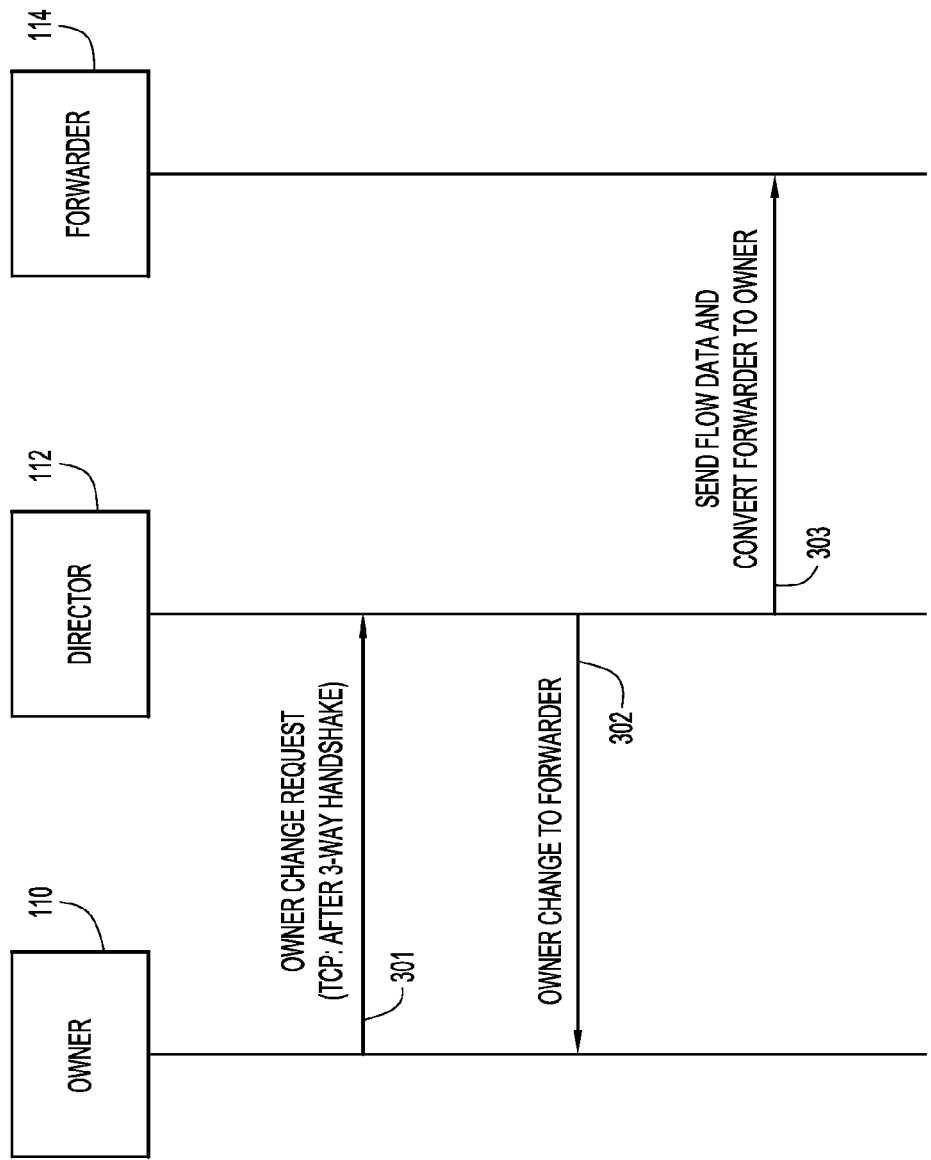
FIG. 3 is an example flow chart depicting a series of operations to implement transfer of ownership of a connection flow within a security device cluster according to an example embodiment.

FIG. 3 is an example flow chart depicting a series of operations to implement transfer of ownership of a connection flow within a security device cluster according to an example embodiment. Shown at the top of the drawing are an Owner 110, Director 112 and Forwarder 114, the same security device components depicted in FIGS. 1A and 1B. To implement an ownership change or transfer, at 301 Owner 110 sends an Owner change request to Director 112. Director 112, at 302, notifies Owner 110 to convert itself to a Forwarder. At 303, Director 112 sends flow data to Forwarder 114 and converts Forwarder 114 to the new Owner. It is noted that during the small window before messages 302 and 303, both security devices 110 and 114 operate as forwarders at same time, and packets received by them could be forwarded between them, back and forth, until security device 114 becomes final, new, Owner.

Another approach is to swap the order of messages 302 and 303, so that during the small window between them, both security devices 110 and 114 process packets.

In summary, the described mechanism, in the context of a TCP flow, provides assignment of the flow processing function within a fully distributed cluster of stateful security devices.

A cluster member receiving the first TCP SYN segment for a connection does not assume ownership over the flow. Instead, that cluster member forwards the packet based on the local policy, optionally creates a stateful backup record on the flow Director unit, and transitions to a Forwarder role for the duration of the flow.

A cluster member receiving the TCP SYN ACK segment retrieves the necessary state information from the flow Director or re-creates it locally and assumes ownership over the flow. Subsequently received packets matching this flow will be redirected from other units (Forwarders) to the Owner for stateful processing. This minimizes the amount of data redirected between cluster members for most server-client data transfers.

For existing flows, an Owner monitors the number of packets and amount of data redirected to it for processing from other cluster members. If a particular non-owner unit is receiving more data or packets directly than the current Owner, the Owner may initiate a process of transferring flow ownership to a better suited Forwarder. This optimizes network resource utilization for client server data transfers and under changing external load-balancing conditions.

For applications that involve multiple associated control and data sessions, the control flow ownership may be transferred to the unit that processes the most data traffic. This can help to significantly reduce the amount of redirected traffic, since the control connections pass relatively little data.

In multi-site deployment scenarios, a Forwarder may request to assume ownership of a flow or a set of flows if it detects that the associated protected endpoint was migrated under its local control based on either Layer 2 information (Address Resolution Protocol—ARP), transit routing updates (Locator/Identifier Separation Protocol—LISP), or any other factors. This makes it possible to localize flow processing to a particular site and preserve valuable inter-site bandwidth.

The flow Director can be used as the arbitrator for performing synchronized flow ownership transfer from the owner to a forwarder.

Figure 4:
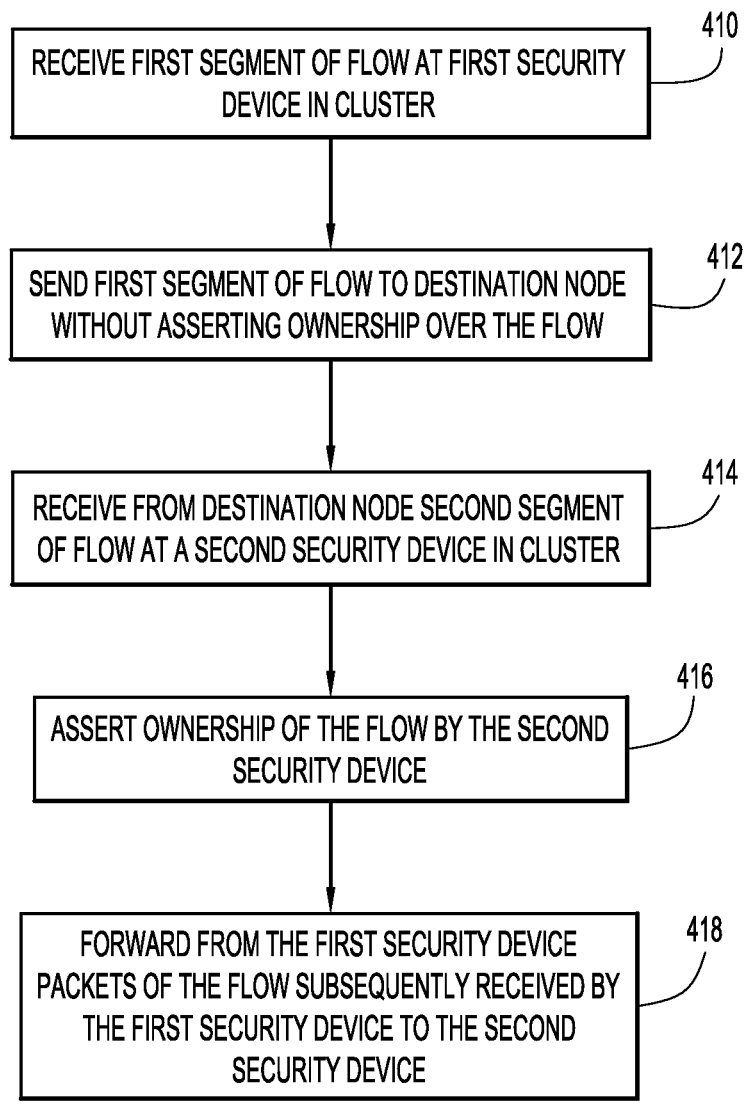
FIG. 4 is another example flow chart depicting a series of operations to implement stateful connection processing in a security device cluster according to an example embodiment.

FIG. 4 is another example flow chart depicting a series of operations to implement stateful connection processing in a security device cluster according to an example embodiment.

As shown, at 410, in a security device cluster comprising a plurality of security devices each configured to receive respective data flows, a first segment of a flow is received at a first security device of the plurality of security devices. At 412, the first segment of the flow is sent toward a destination node without the first security device of the plurality of security devices asserting ownership over the flow. At 414, a second segment of the flow is received from the destination node at a second security device of the plurality of security devices, the second segment of the flow being responsive to the first segment. At 416, the second security device of the plurality of security devices asserts ownership over the flow. At 418, packets of the flow subsequently received by the first security device (or a third security device) are forwarded from the first security device (or third security), to the second security device.

Thus, as explained, a security device within a cluster that will likely end up handling more packets or data of the flow is selected as the Owner and a security device within a cluster that will likely end up handling fewer packets or data of the flow is selected as the Forwarder, thereby reducing a volume of data to be forwarded within the security device cluster.

Although the embodiments have been described in connection with security device clusters, the principle of operations of the embodiments can also be applied to, e.g., a multi-threaded, multi-core central processing unit (CPU) running, e.g., separate security processes. That is, a security cluster comprising a plurality of individual security devices, could also be implemented as an embedded system with different instances of security device functionality operating simultaneously. Movement of data among the instances could also be controlled in accordance with the principles described herein.

Figure 5:
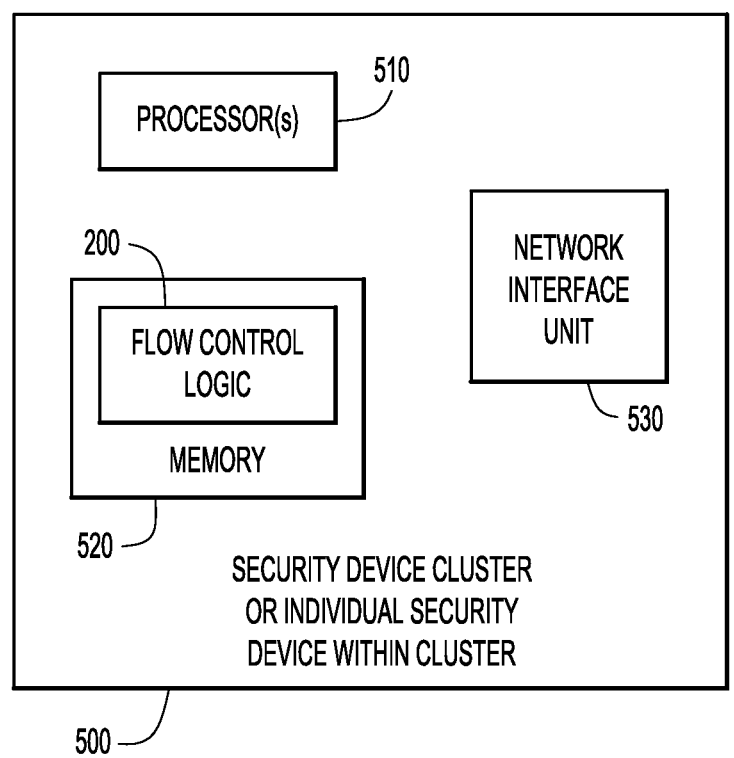
FIG. 5 depicts a block diagram of a security device cluster according to an example embodiment.

FIG. 5 depicts a block diagram of security device cluster 500 or a given one of the security devices 110, 112, 114 deployed within security device cluster according to an example embodiment. Each security device within security device cluster 500 includes a processor 510, memory 520 and a network interface unit 530. Processor 510 may be configured to perform the functions of flow control logic 200 (i.e., the operations depicted in FIGS. 2 and 3), among other functions. Memory 520 is configured to store a variety of data and software instructions including flow control logic 200. Network interface unit 530 may include one or more ports or network interface cards via which the security device 110, 112, 114 can communicate with a network such as network 150.

Processor 510 may be, for example, a microprocessor or microcontroller that executes instructions for implementing the processes described herein. Memory 520 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 520 may comprise one or more tangible (non-transitory) computer readable storage media (e.g., a memory device) encoded with software comprising computer executable instructions and when the software is executed (by processor 510) is operable to perform, in concert with other security devices within security device cluster 500 the operations described herein.

As described herein distributed clusters of stateful security or inspection devices typically localize processing of all packets for a single TCP or UDP connections to a single member. This ownership assignment is typically performed at the time of flow creation and does not account for changing traffic patterns. When different directions of a single flow are distributed to different cluster members, packets are redirected to the single owner unit for processing. The embodiments described herein provide an optimization mechanism for determining the initial Owner of a TCP (or other) connection, where the amount of redirected data between cluster members is minimized. Furthermore, the presented embodiments enable dynamic ownership transfer of existing stateful connections based on variable traffic patterns and topology changes thus further optimizing the use of network resources.

In sum, application performance and network utilization may be significantly optimized by reducing the amount of data being forwarded between cluster members in a security device cluster for the purpose of full stateful inspection. Various criteria can be used to assign flow ownership based on natural traffic patterns within the protected network rather than forcing all traffic through a central chokepoint within the stateful security device cluster.

To summarize, in one form, a method is provided. The method is operable in a security device cluster having a plurality of security devices each configured to receive respective data flows. The method includes receiving a first segment of a flow at a first security device of the plurality of security devices, sending the first segment of the flow toward a destination node without the first security device of the plurality of security devices asserting ownership over the flow, receiving, from the destination node, a second segment of the flow at a second security device of the plurality of security devices, the second segment of the flow being responsive to the first segment, asserting, by the second security device of the plurality of security devices, ownership over the flow, and forwarding, from the first security device, packets of the flow subsequently received by the first security device to the second security device.

In another form, an apparatus is provided. The apparatus is in the form of a security device cluster. The apparatus includes a network interface unit configured to enable communications via a network, a memory configured to store logic instructions, and at least one processor, when executing the logic instructions, configured to: receive a first segment of a flow at a first security device of a plurality of security devices within the apparatus, send the first segment of the flow toward a destination node without the first security device of the plurality of security devices asserting ownership over the flow, receive, from the destination node, a second segment of the flow at a second security device of the plurality of security devices, the second segment of the flow being responsive to the first segment, assert, by the second security device of the plurality of security devices, ownership over the flow, and forward, from the first security device, packets of the flow subsequently received by the first security device to the second security device.

In still another form, a non-transitory tangible computer readable storage media encoded with instructions that, when executed by at least one processor, is configured to cause the processor to: receive a first segment of a flow at a first security device of a plurality of security devices within the apparatus, send the first segment of the flow toward a destination node without the first security device of the plurality of security devices asserting ownership over the flow, receive, from the destination node, a second segment of the flow at a second security device of the plurality of security devices, the second segment of the flow being responsive to the first segment, assert, by the second security device of the plurality of security devices, ownership over the flow, and forward, from the first security device, packets of the flow subsequently received by the first security device to the second security device.

The above description is intended by way of example only. Various modifications and structural changes may be made therein without departing from the scope of the concepts described herein and within the scope and range of equivalents of the claims.

What is claimed is:

1. A method comprising:
   in a security device cluster comprising a plurality of security devices each configured to receive respective data flows, receiving a first segment of a flow at a first security device of the plurality of security devices;
   sending the first segment of the flow toward a destination node without the first security device of the plurality of security devices asserting ownership over the flow;

receiving, from the destination node, a second segment of the flow at a second security device of the plurality of security devices, the second segment of the flow being responsive to the first segment;
asserting, by the second security device of the plurality of security devices, ownership over the flow; and
as a result of the second security device asserting ownership over the flow, forwarding, from the first security device, packets of the flow subsequently received by the first security device to the second security device such that the packets of the flow subsequently received by the first security device are processed by the second security device along with the packets of the flow subsequently received by the second security device.

2. The method of claim 1, further comprising storing in a third security device information to associate the first segment with the second segment of the flow.

3. The method of claim 1, wherein the first segment comprises a SYN packet, consistent with the transmission control protocol (TCP), received from a client device at the first security device.

4. The method of claim 1, wherein the second segment comprises a SYN ACK packet, consistent with the transmission control protocol (TCP), received at the second security device.

5. The method of claim 1, wherein the security device cluster comprises a director unit, and the method further comprises storing in the director unit information that enables the first security device to identify to which security device among the plurality of security devices to forward the subsequent packets.

6. The method of claim 1, further comprising monitoring by the second security device a number of packets or bytes that the second security device receives natively and receives through forwarding within the security device cluster from at least one of the first security device or a third security device within the cluster.

7. The method of claim 6, further comprising transferring ownership of the flow from the second security device to one of the first security device or the third security device when the number of bytes or number of packets in the flow being forwarded exceeds a number of bytes or number of packets received by the owner.

8. The method of claim 1, further comprising receiving a forwarded flow segment over a long distance inter-site link.

9. The method of claim 1, further comprising transferring ownership of the flow from the second security device to one of the first security device or a third security device upon detection of a network topology change.

10. An apparatus comprising:
a network interface unit that enables communications via a network;
a memory that stores logic instructions; and
at least one processor, when executing the logic instructions, that:
receives a first segment of a flow at a first security device of a plurality of security devices;
sends the first segment of the flow toward a destination node without the first security device of the plurality of security devices asserting ownership over the flow;
receives, from the destination node, a second segment of the flow at a second security device of the plurality of security devices, the second segment of the flow being responsive to the first segment;
asserts, by the second security device of the plurality of security devices, ownership over the flow; and
as a result of the second security device asserting ownership over the flow, forwards, from the first security device, packets of the flow subsequently received by the first security device to the second security device such that the packets of the flow subsequently received by the first security device are processed by the second security device along with the packets of the flow subsequently received by the second security device.

11. The apparatus of claim 10, wherein the at least one processor, when executing the logic instructions:
stores information in a third security device to associate the first segment with the second segment of the flow.

12. The apparatus of claim 10, wherein the first segment comprises a SYN packet, consistent with the transmission control protocol (TCP), received from a client device at the first security device.

13. The apparatus of claim 10, wherein the second segment comprises a SYN ACK packet, consistent with the transmission control protocol (TCP), received at the second security device.

14. The apparatus of claim 10, further comprising a director unit, and wherein the at least one processor, when executing the logic instructions:
stores in the director unit information that enables the first security device to identify to which security device among the plurality of security devices to forward the subsequent packets.

15. The apparatus of claim 10, wherein the at least one processor, when executing the logic instructions:
monitors a number of packets or bytes that the second security device receives natively and receives through forwarding within the security device cluster from one of the first security device or a third security device.

16. The apparatus of claim 15, wherein the at least one processor, when executing the logic instructions:
transfers ownership of the flow from the second security device to one of the first security device or the third security device when the number of bytes or number of packets in the flow being forwarded exceeds a number of bytes or number of packets received by the owner.

17. The apparatus of claim 10, wherein the at least one processor, when executing the logic instructions:
transfers ownership of the flow from the second security device to one of the first security device or a third security device upon detection of a network topology change.

18. A non-transitory tangible computer readable storage media encoded with instructions that, when executed by at least one processor, is configured to cause the processor to:
receive a first segment of a flow at a first security device of a plurality of security devices within a security device cluster;
send the first segment of the flow toward a destination node without the first security device of the plurality of security devices asserting ownership over the flow;
receive, from the destination node, a second segment of the flow at a second security device of the plurality of security devices, the second segment of the flow being responsive to the first segment;
assert, by the second security device of the plurality of security devices, ownership over the flow; and
as a result of the second security device asserting ownership over the flow, forward, from the first security device, packets of the flow subsequently received by the first security device to the second security device such that the packets of the flow subsequently received by the first security device are processed by the second security device along with the packets of the flow subsequently received by the second security device.

19. The computer readable storage media of claim 18, further comprising instructions to cause the processor to:
store information in a third security device to associate the first segment with the second segment of the flow.

20. The computer readable storage media of claim 18, further comprising instructions to cause the processor to:
store in the director unit information that enables the first security device to identify to which security device among the plurality of security devices to forward the subsequent packets.

* * * * *